(12) United States Patent
Krause

(10) Patent No.: US 7,066,045 B2
(45) Date of Patent: Jun. 27, 2006

(54) ASSEMBLY COMPRISING A SPINDLE AND A MOVING NUT

(75) Inventor: Reinhard Krause, Marktredwitz-Brand (DE)

(73) Assignee: TRW Automotive Electronics & Components GmbH & Co. KG, Enkenbach-Alsenborn (DE)

( * ) Notice: Subject to any disclaimer, the term of this patent is extended or adjusted under 35 U.S.C. 154(b) by 98 days.

(21) Appl. No.: 10/351,830

(22) Filed: Jan. 27, 2003

(65) Prior Publication Data

US 2003/0140720 A1     Jul. 31, 2003

(30) Foreign Application Priority Data

Jan. 29, 2002  (DE)  ............................ 102 03 385

(51) Int. Cl.
 *F16H 1/18*    (2006.01)
(52) U.S. Cl. .................. 74/424.78; 74/89.36
(58) Field of Classification Search ............. 74/424.71, 74/424.78, 424.96, 89.23, 89.36, 89.37; 411/6, 411/182, 189, 305, 306, 392; 470/8, 903, 470/2
See application file for complete search history.

(56) References Cited

U.S. PATENT DOCUMENTS

| | | | | |
|---|---|---|---|---|
| 2,791,129 A | * | 5/1957 | Russell | ......................... 74/441 |
| 3,841,877 A | * | 10/1974 | Andrews | ..................... 430/382 |
| 4,480,869 A | * | 11/1984 | Splithoff | ..................... 296/217 |
| 4,945,781 A | * | 8/1990 | Isert | ........................ 74/424.94 |
| 5,015,133 A | * | 5/1991 | Arena | ......................... 411/267 |
| 5,258,894 A | * | 11/1993 | Bivens | ....................... 362/528 |
| 5,298,215 A | | 3/1994 | Krause | |
| 5,676,019 A | * | 10/1997 | Shenk et al. | ............. 74/424.95 |
| 5,852,949 A | * | 12/1998 | Cartensen | ................ 74/424.94 |
| 5,937,702 A | * | 8/1999 | Erikson et al. | .......... 74/424.95 |
| 6,119,541 A | | 9/2000 | Robinson | |
| 2001/0000051 A1 | * | 3/2001 | Buchanan et al. | ......... 74/89.15 |

FOREIGN PATENT DOCUMENTS

| | | |
|---|---|---|
| DE | 1814994 | 6/1974 |
| DE | 3239046 A1 * | 4/1984 |
| DE | 3340122 C2 | 5/1985 |
| DE | 29805290 U1 | 8/1998 |
| DE | 19751592 A1 | 6/1999 |
| DE | 19904079 A1 | 8/2000 |
| DE | 29914117 U1 | 8/2000 |
| FR | 0 448 515 A1 * | 3/1991 |

* cited by examiner

*Primary Examiner*—David Fenstermacher
(74) *Attorney, Agent, or Firm*—Tarolli, Sundheim, Covell & Tummino LLP

(57) ABSTRACT

An assembly comprises a spindle and a moving nut disposed on the spindle. The spindle and the moving nut are made of plastics. At least one of the two components spindle and moving nut being resilient such that the moving nut is prevented from getting stuck on the spindle. There is further proposed an actuator including such assembly.

9 Claims, 4 Drawing Sheets

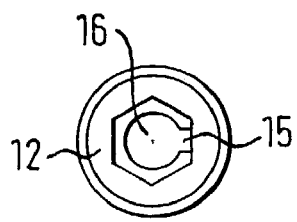
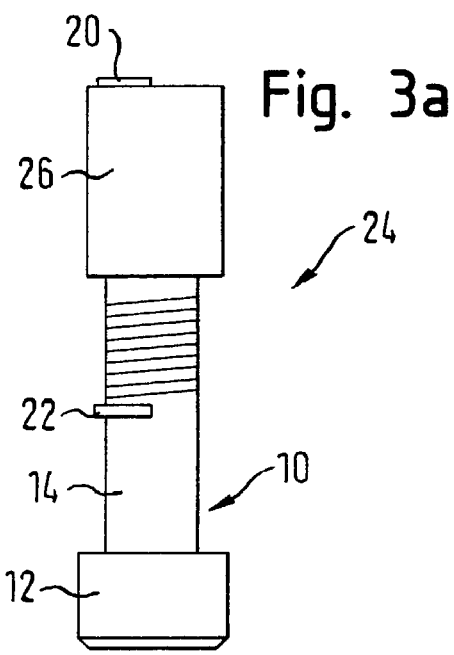
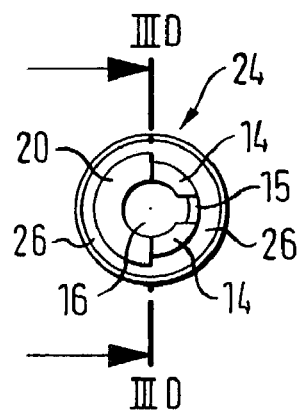
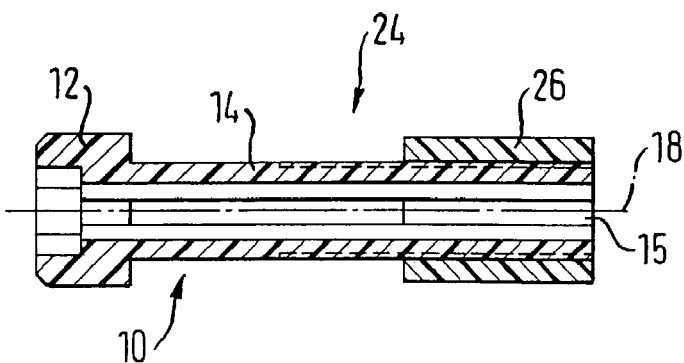

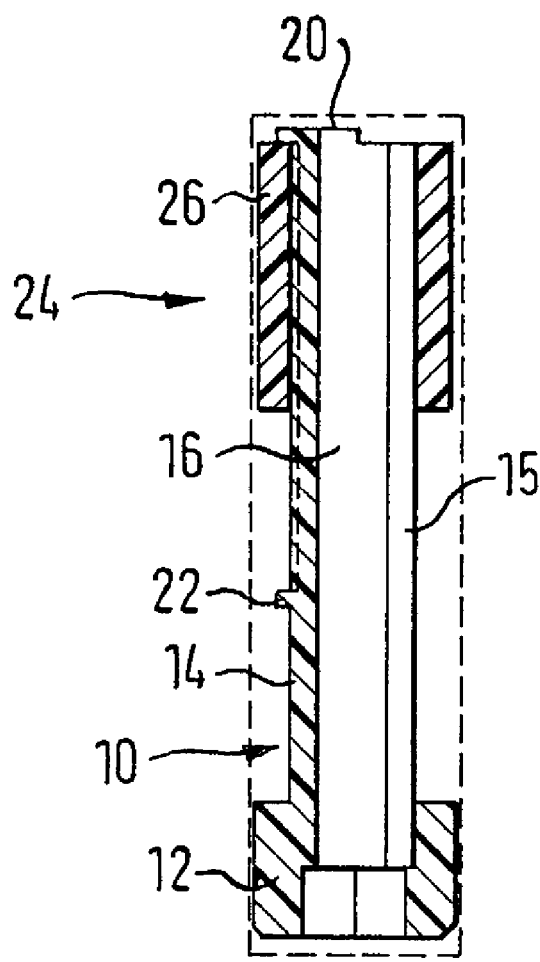
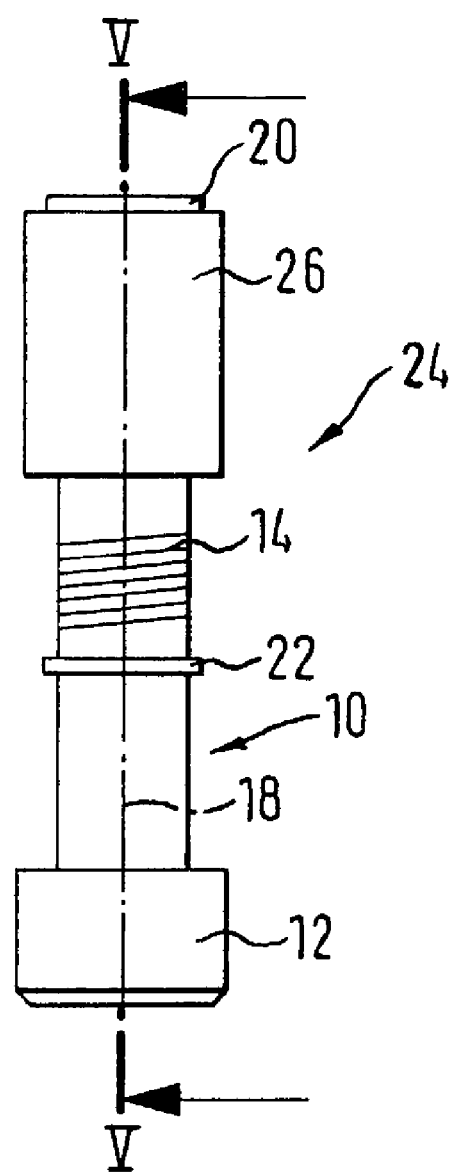

ASSEMBLY COMPRISING A SPINDLE AND A MOVING NUT

TECHNICAL FIELD

This invention relates to an assembly comprising a spindle and a moving nut disposed on the spindle.

BACKGROUND OF THE INVENTION

Such assemblies are used for converting rotational movements into translational movements. When such an assembly is designed for small loads, for instance in a motor vehicle for actuating ventilation nozzles or air outflow grids, the two components spindle and moving nut are preferably made of plastics. With regard to a small mounting effort it would be desirable to form the two components as injection-molded parts, one of which is inseparably connected with the other.

In principle, it is possible to directly apply one part onto another by injection-molding such that the two injection-molded parts are movable relative to each other. There can be used for instance a method of injection molding articles which consist of at least two parts, as it is known from DE 33 40 122 C2. In this method, a first injection-molded part is fabricated in a first mold, the same is then removed from the first mold and placed into a second mold. The first injection-molded part will cool in the process and solidify to such an extent that subsequently in the second mold the second injection-molded part can be injected into the first injection-molded part. The two injection-molded parts can thus movably, but inseparably be connected with each other.

Since the first injection-molded part already has solidified in part, before the second injection-molded part is formed, the first injection-molded part already has experienced part of its inevitable shrinkage, before the material for the second injection-molded part is injected. This can lead to the second injection-molded part getting jammed on the first injection-molded part, when the second injection-molded part now shrinks for its part. When the second injection-molded part is the moving nut, it will get shrunk onto the spindle upon solidification, so that the two components are very tight or are even blocked relative to each other.

Therefore, it is the object of the invention to provide an assembly comprising a spindle and a moving nut as described above, in which the movability between spindle and moving nut is not impaired, even if one of the components is applied on the other one by injection-molding or is injected into the other one.

BRIEF SUMMARY OF THE INVENTION

According to the invention, an assembly comprises a spindle and a moving nut disposed on the spindle. The spindle and the moving nut are made of plastics. At least one of the two components spindle and moving nut being resilient such that the moving nut is prevented from getting stuck on the spindle. By means of the resilient design of spindle or moving nut it is achieved that even with a reduction of the radial dimensions of the moving nut at least either the spindle or the moving nut will give way elastically such that the movability of the moving nut with respect to the spindle is not disturbed.

In a preferred embodiment of the invention, an actuator is equipped with an assembly comprising a spindle and a moving nut disposed on the spindle. Such actuator can be used in particular for adjusting a ventilation flap of a ventilation system of a motor vehicle or an adjustable headlamp.

Further advantageous aspects of the invention can be taken from the sub-claims.

BRIEF DESCRIPTION OF THE DRAWINGS

FIG. 3a shows a side view of the first embodiment of the assembly in accordance with the invention, FIG. 3b shows a second side view of the first embodiment of the assembly in accordance with the invention, FIG. 3c shows a third side view of the first embodiment of the assembly in accordance with the invention, FIG. 3d shows a sectional view of the first embodiment of the assembly in accordance with the invention along line IIID—IIID in FIG. 3c, FIG. 4 shows another side view of the first embodiment of the assembly in accordance with the invention, FIG. 5 shows a sectional view of the first embodiment of the assembly in accordance with the invention along line V—V in FIG. 4.

DETAILED DESCRIPTION OF THE PREFERRED EMBODIMENTS

Figure 2:
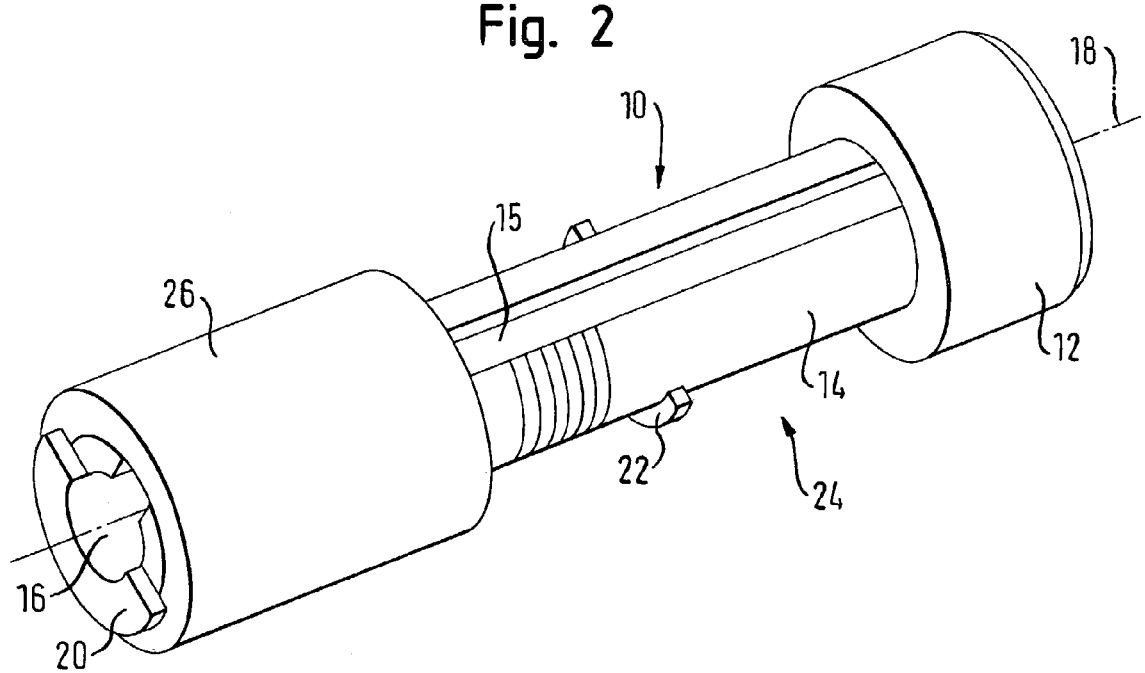
FIG. 2 shows a perspective view of the assembly comprising spindle and moving nut in accordance with the first embodiment of the invention.
Figure 1:
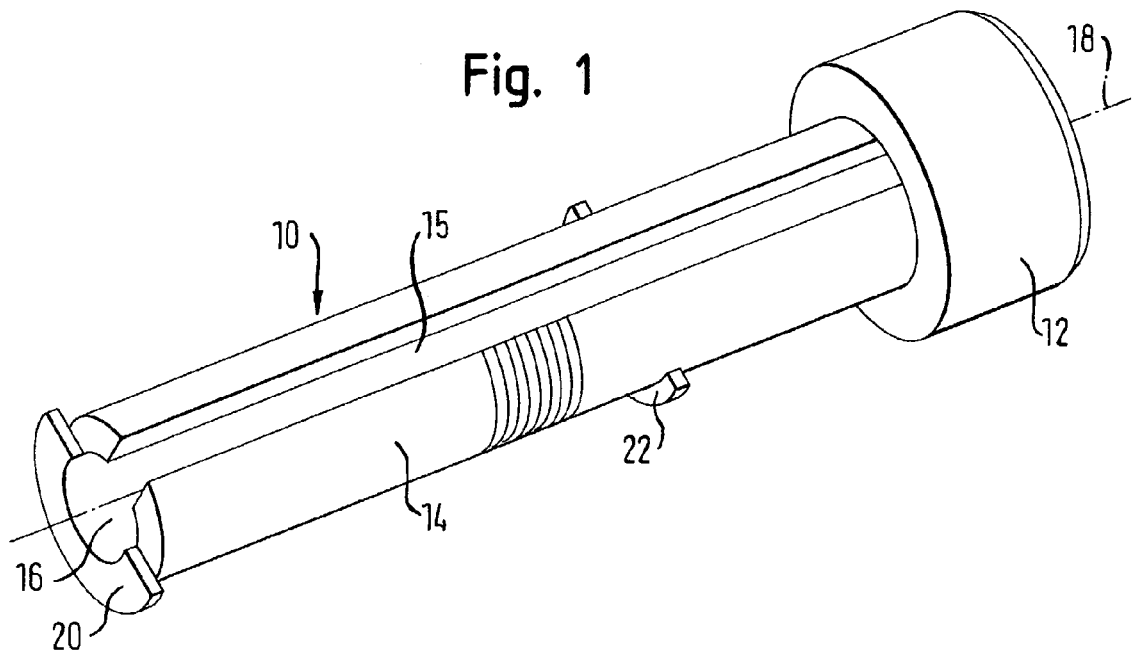
FIG. 1 shows a perspective view of a spindle in accordance with a first embodiment of the invention.

FIG. 1 shows a spindle 10 which is made of plastics and comprises a spindle head 12 and a spindle shank 14. The spindle shank 14 is hollow, as a cylindrical through hole 16 with a longitudinal axis 18 extends in its interior. Furthermore, the spindle shank is provided with a continuous spindle slot 15, which extends from the outer surface of the spindle shank to the through hole.

At its axial end opposite the spindle head 12, the spindle shank 14 has a first stop 20, and in an approximately middle portion of the spindle shank a second stop 22. Both stops are integrally formed with the spindle.

FIGS. 2 to 5 illustrate an assembly 24 comprising the spindle 10 and a moving nut 26. The moving nut 26, which substantially has the shape of a hollow cylinder, is made of plastics and is disposed on the spindle shank 14 between the first stop 20 and the second stop 22. The external thread provided on the spindle shank 14 is represented only schematically. There is not represented the internal thread of the moving nut 26, which corresponds with the external thread of the spindle shank.

By rotating the spindle 10, the moving nut 26 can be moved between the first stop 20 and the second stop 22. The first stop serves to limit the travel of the moving nut beyond the end of the spindle shank 14, the second stop serves to limit the travel of the moving nut towards the spindle head 12. This is particularly advantageous, as on the one hand the moving nut 26 cannot get lost, but on the other hand the travel of the moving nut on the spindle shank is limited to a defined region.

In the following, there will be explained a method of producing the first embodiment of the assembly comprising a spindle and a moving nut.

The spindle 10 is produced as injection-molded part, an integral core being used for generating the through hole 16 and the spindle slot 15. The core slightly protrudes beyond the outer surface of the spindle shank, so that it can easily be removed later on. This protruding "back" is not provided with a thread.

Upon injection molding the spindle, the same is inserted into a second tool, without the core having been removed, and the moving nut 26 is applied by injection-molding. In this step, the core left in the spindle shank is used for stabilization; it prevents the spindle shank from deforming under the molding pressure.

Upon injection-molding the moving nut 26, the core can be withdrawn from the spindle 10 in longitudinal direction. This is easily possible, as the back of the core protruding beyond the outer surface of the spindle shank is non-threaded. The depression in the internal thread of the moving nut, which is formed by the protruding back, does not disturb.

The shrinkage which occurs during the solidification of the moving nut 26 along with the corresponding reduction of the inside diameter of the thread of the moving nut is compensated in that the spindle shank gives way elastically, i.e. the width of the spindle slot 15 is reduced. As a result, the moving nut can be moved on the spindle shank 14 with little friction.

The amount of friction between the moving nut and the spindle can be adjusted by the ratio between the inside diameter of the through hole 16 and the outside diameter of the spindle shank 14, i.e. by selecting the wall thickness of the spindle shank. The smaller the wall thickness, the smaller the spring force of the spindle shank acting against a deformation, and the friction also is correspondingly small.

The elasticity of the spindle shank can be adjusted such that a kind of sliding clutch is achieved between the moving nut and the spindle shank. When the moving nut strikes against one of the stops, but the spindle is moved on, the spindle slot is narrowed to such an extent that the moving nut slips through on the thread of the spindle shank and snaps into the next thread.

Figure 6:
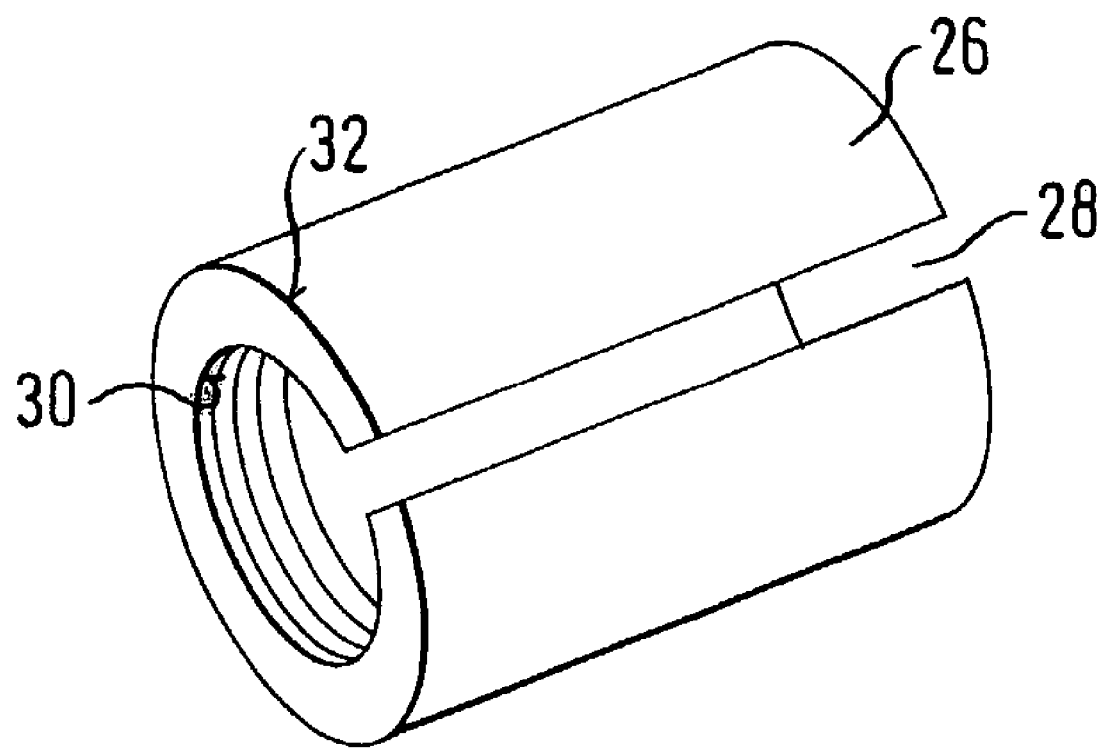
FIG. 6 shows a perspective view of the moving nut in accordance with a second embodiment of the invention.

FIG. 6 shows the moving nut 26 of the second embodiment, which substantially has the shape of a hollow cylinder and comprises an inner wall 30 and an outer wall 32. The moving nut includes a nut slot 28 which extends across the entire length of the moving nut from the inner wall 30 to the outer wall 32.

The second embodiment of the assembly comprising spindle and moving nut is produced as follows: First of all, the spindle is produced as a solid injection-molded part. There is used an injection molding tool provided with an oblong projection in the vicinity of the thread, the dimensions of this projection approximately corresponding to the nut slot, so that a non-threaded groove is formed at one point of the spindle shank. In a second step, the moving nut is applied onto the spindle by injection-molding. Provided on the injection molding tool is a web which is used for producing the nut slot and extends into the non-threaded groove of the spindle.

In principle, it is also possible to form the spindle without the non-threaded groove and provide the web at the second injection molding tool with a counterpart of the thread of the spindle, so that the web can exactly engage in the external thread of the spindle shank. However, this involves a great manufacturing effort.

The moving nut undergoes shrinkage, but can resiliently expand over the spindle shank 14 of the spindle 10 because of the nut slot 28 extending across the entire length of the moving nut. Here as well, a smooth movement of the moving nut 26 on the spindle shank 14 is ensured. There can also be produced the above-described effect of a sliding clutch.

The invention claimed is:

1. An assembly comprising a spindle and a moving nut disposed on said spindle, said spindle and said moving nut being made of plastics, said spindle having a hollow portion defined by a hole, said spindle further having an axial spindle slot, said spindle slot radially extending from an outer surface of said spindle to said hole, said spindle slot extending along an entire axial length of said spindle.

2. The assembly as claimed in claim 1, wherein said spindle has a first and a second stop for said moving nut, which are both integrally formed with said spindle.

3. The assembly as claimed in claim 1, wherein said spindle is an injection-molded part.

4. The assembly as claimed in claim 1, wherein said moving nut is an injection-molded part.

5. The assembly as claimed in claim 1, wherein said moving nut is applied onto said spindle by injection-molding.

6. The assembly as claimed in claim 1, wherein said spindle slot is straight in the axial direction.

7. An assembly comprising a spindle and a moving nut disposed on said spindle, said spindle and said moving nut being made of plastics, one of said spindle and said moving nut having an inner surface, an outer surface, and an axial slot extending radially from said outer surface to said inner surface, said slot extending along an entire axial length of said one of said spindle and said moving nut.

8. An assembly as claimed in claim 7 wherein said axial slot extends radially from said outer surface of said moving nut to said inner surface of said moving nut.

9. An assembly as claimed in claim 7 wherein said axial slot extends radially from said outer surface of said spindle to said inner surface of said spindle.

* * * * *